United States Patent [19]
Mueller et al.

[11] 4,098,381

[45] Jul. 4, 1978

[54] TRANSMISSION SHIFT MECHANISM

[76] Inventors: Otto Mueller, 13 Byfield La., Dearborn, Mich. 48120; Alvie V. Fox, 33555 Quaker Valley Rd., Farmington, Mich. 48024

[21] Appl. No.: 771,398

[22] Filed: Feb. 23, 1977

[51] Int. Cl.² ............................................. F16D 23/02
[52] U.S. Cl. ........................... 192/48.91; 192/53 R; 192/67 A; 192/108
[58] Field of Search ................ 192/48.91, 53 R, 53 B, 192/67 R, 67 A, 108

[56] References Cited
U.S. PATENT DOCUMENTS

| | | | |
|---|---|---|---|
| 2,667,252 | 1/1954 | Meyer | 192/53 B X |
| 2,969,134 | 1/1961 | Wiedmann et al. | 192/108 X |
| 3,425,527 | 2/1969 | Wolf | 192/53 R X |
| 3,603,437 | 9/1971 | Spencer | 192/53 B X |

*Primary Examiner*—Allan D. Herrmann
*Attorney, Agent, or Firm*—Olsen and Stephenson

[57] ABSTRACT

Apparatus for shifting a transmission including a shift collar axially movable on splines on one rotary member for engagement with the splines of an adjacent rotary member to provide corotation of the rotary members, the shift collar and the adjacent rotary member having engagement means responsive to thrust applied axially to the shift collar for initially synchronizing rotation of the shift collar and the adjacent rotary member and then for guiding the splines of the shift collar onto the splines of the adjacent rotary member, the engagement means being constructed and arranged so that the parts to be synchronized can be guided together from positions of wide angular misalignment to positions of proper axial alignment for completing the shifting operation.

7 Claims, 7 Drawing Figures

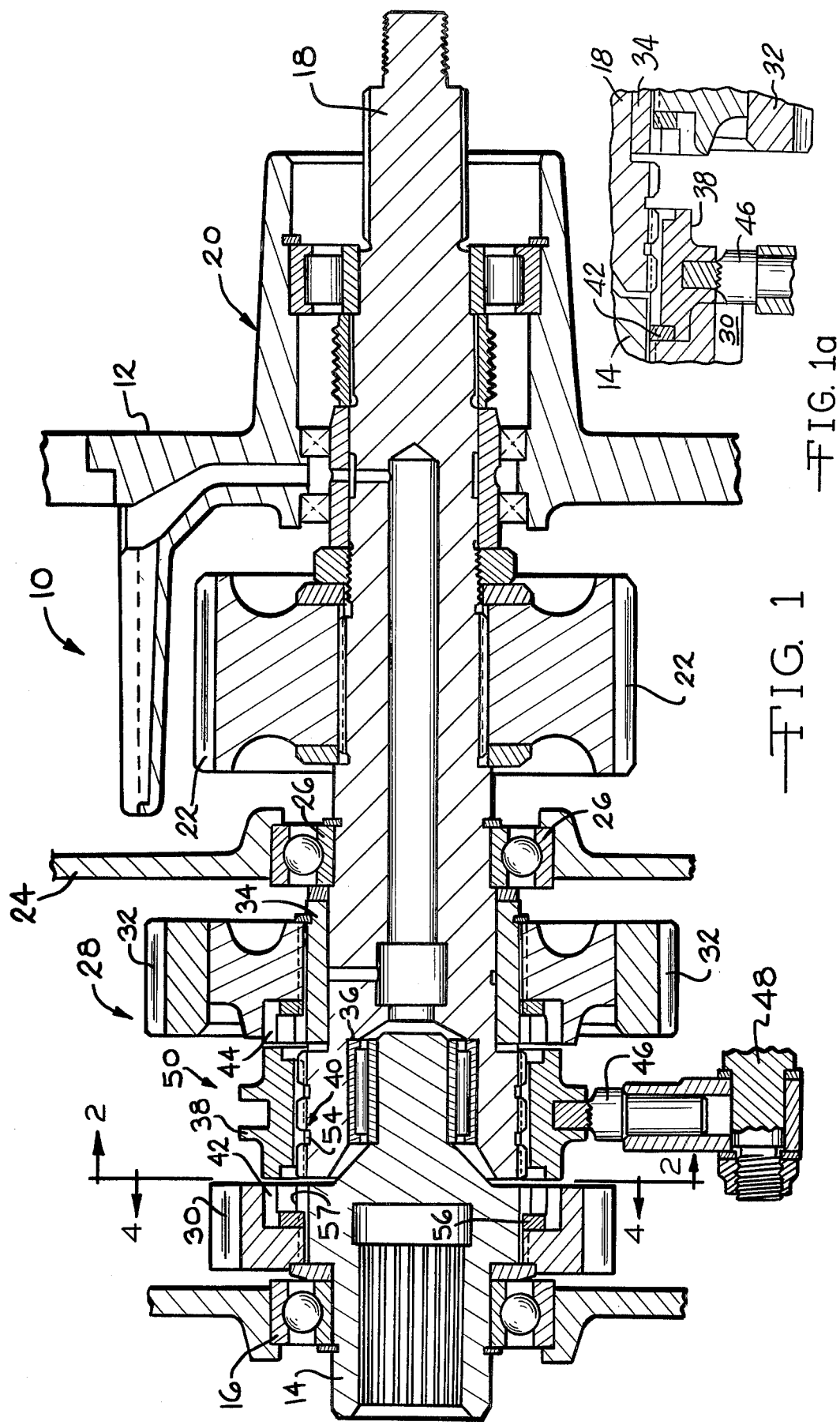

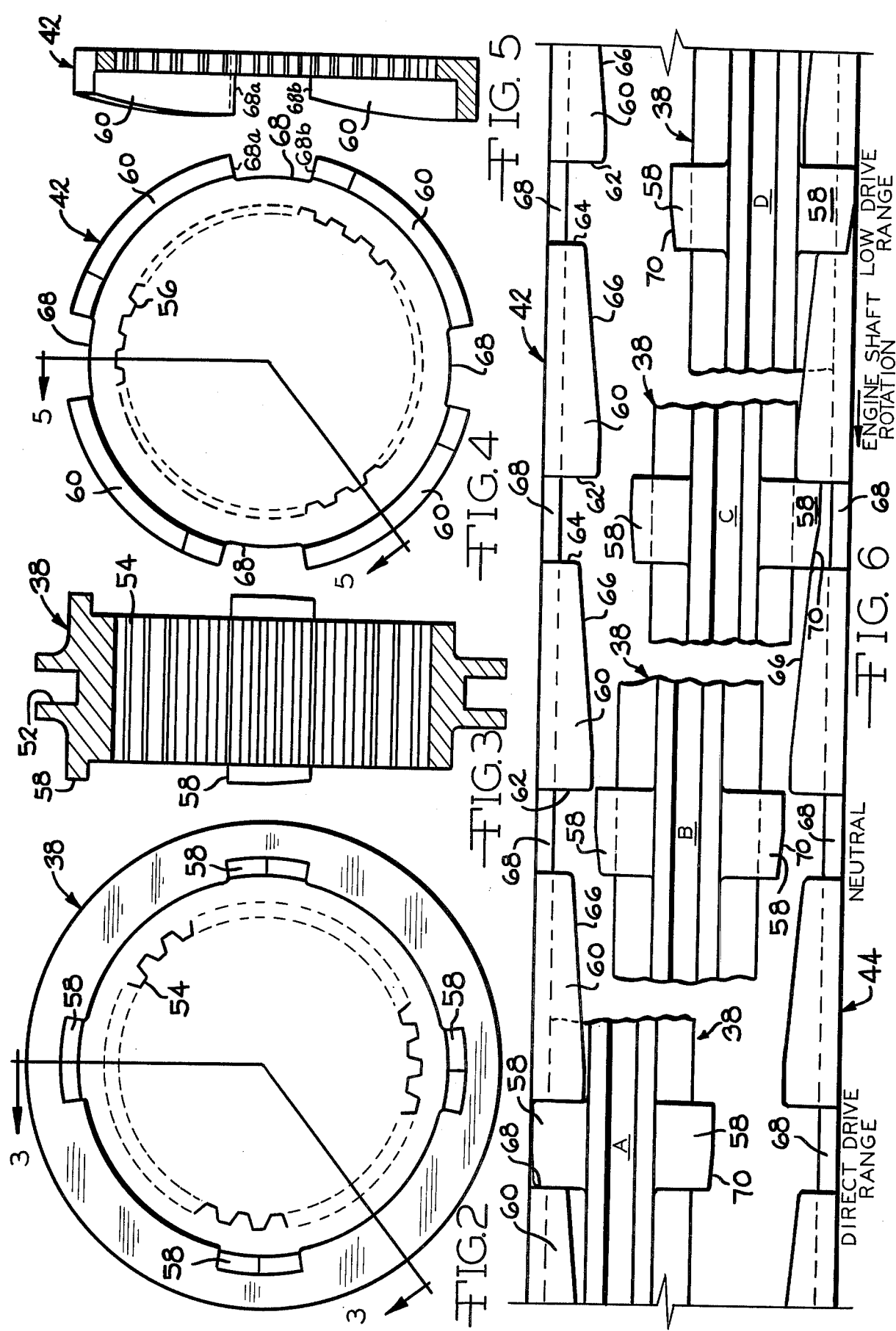

TRANSMISSION SHIFT MECHANISM

BACKGROUND OF THE INVENTION

The present invention relates to a shift mechanism for use with rotary members of a transmission having a multiple path drive system.

In transmissions of this type, it is conventional practice to use a shift collar on one rotary member in conjunction with a clutch ring on an adjacent rotary member initially to synchronize the rotation of the rotary members and then to clutch the members together for corotation. However, conventional shift mechanisms of this character are not completely satisfactory, particularly when it is desired to actuate the shift mechanisms from remote locations by sources of power, such as hydrualic cylinders or the like. One form of hydraulic power shifting apparatus of this character can be found in the copending application of Mueller Ser. No. 771,397, filed Feb. 23, 1977. When use is made of hydraulic power to actuate the conventional types of shifting mechanisms, problems are sometimes encountered, such as noisy operation, uneven and rough grabbing of the clutching elements and the like. These undesirably features may also cause future service and maintenance problems.

SUMMARY OF THE INVENTION

The present invention has overcome the inadequacies of the prior art and provides an improved transmission shift mechanism which is particularly, but not exclusively, adapted for use with remotely controlled power apparatus to shift the transmission from one to another speed drive range or between a speed drive range and a neutral position.

According to a preferred form of the invention, a shift mechanism is provided comprising first and second rotary members mounted for rotation adjacent to one another about a common axis, the rotary members having external splines around outer peripheries equal in numbers and dimensions, a shift collar having internal splines around an inner circumference mounted with its internal splines in meshing engagement with the external splines of one of the rotary members, the shift collar being shiftable axially to a position so that its internal splines are also in mesh with the external splines of the other rotary member to provide corotation of the two rotary members, and engagement means are provided for (1) synchronizing rotation of the other rotary member with said shift collar for uniform corotation during initial axial movement of the shift collar and thereafter for (2) guiding the splines of the shift collar onto the external splines of the other rotary member during further axial movement of the shift collar. The engagement means include a plurality of circumferentially spaced blocking members on one of the parts to be synchronized, axially directed toward the other of the parts to be synchronized, and a plurality of circumferentially spaced cam members are on said other part axially directed toward the blocking members of said one part. Each of the cam members has a surface inclined in a circumferential direction away from the one part that terminates in a trailing edge spaced from the leading edge of the next adjacent cam member to provide an axial slot of a dimension sufficient to accommodate a blocking member of said one part. The splines of said shift collar and said one rotary member are in alignment with one another for meshing when said blocking member is in axial alignment with said slot.

By virtue of this construction and arrangement relative axial movement of the parts can occur, and the part containing the blocking members can be relatively advanced so that the blocking members engage the cam members initially at positions substantially out of axial alignment from the positions that must be realized before the parts can be clutched together, and the blocking members can then be guided on the cams to the slots between adjacent cams for further advancement into a complete clutching engagement.

Other objects of this invention will appear in the following description and appended claims, reference being had to the accompanying drawings forming a part of this specification wherein like reference characters designate corresponding parts of the several views.

BRIEF DESCRIPTION OF THE DRAWINGS

FIG. 1 is a fragmentary longitudinal section through a transmission, illustrating a shift mechanism embodying the present invention, showing the shift collar in a neutral position;

FIG. 1a is a fragmentary longitudinal section of a portion of FIG. 1, showing the shift collar in a drive position;

FIG. 2 is an end elevational view of the shift collar, taken on th lines 2 — 2 of FIG. 1;

FIG. 3 is a sectional view taken on the lines 3 — 3 of FIG. 2;

FIG. 4 is an end elevational view of the clutch ring of one of the rotary members, taken on lines 4 — 4 of FIG. 1;

FIG. 5 is a sectional view taken on the lines 5 — 5 of FIG. 4; and

FIG. 6 is a developed view of the two clutch rings and showing fragmentarily four positions of the shift collar with respect to these cam rings.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The transmission 10 includes a housing 12 in which is mounted a conventional power input coupling 14, in the bearing 16, and a power drive shaft 18 is supported in housing 12 in the conventional manner in the bearing assembly 20. The drive shaft 18 normally will be connected in driving relationship to a pair of drive wheels of a motor vehicle. A sprocket 22 is secured to the shaft 18 by splines to rotate with the shaft 18. The sprocket 22 is adapted to receive a chain drive (not shown) for connection to a second power output drive shaft which can be used to transmit power to a second pair of drive wheels of the vehicle. Forming a part of the housing structure of the transmission 10 is the housing section 24 which contains a bearing 26, also providing support for the shaft 18.

The transmission 10 includes the multiple path drive system 28, only portions of which are shown, which includes the gear 30 retained in a splined relationship on the power input coupling 14 and the reduction gear 32 supported in splined relationship on the bushing 34 that is supported on shaft 18 for free relative rotation. A needle bearing assembly 36 is disposed between the power input coupling 14 and the power output drive shaft 18 so that free relative rotation of these parts can occur.

A shift collar 38 is mounted on the end of the power output shaft 18 for turning therewith to form a rotary member, and the collar 38 can be moved axially relative thereto in the usual manner by virtue of the splined connection at 40 between these two components. A clutch ring 42 is mounted on the outer splined portion of the power input coupling 14 for rotation with the coupling 14 and gear 30, so that when the shift collar 38 is moved to the left, to the position shown in FIG. 1a, a drive connection will be provided from the power input coupling 14 through the gear 30, clutch ring 42, shift collar 38, to the power output drive shaft 18. The combination of the clutch ring 42, coupling 14 and gear 30 also forms a rotary member.

A clutch ring 44 is splined on the bushing 34 for rotation with the latter and the gear 32 as another rotary member. When the shift collar 38 is moved to the right into clutching engagement with the bushing 34, a different speed drive range is provided which extends from a power input coupling 14 through the gear 30, through a conventional gear train (not shown) connecting in driving relationship gear 30 to gear 32, then through bushing 34, shift collar 38, to the power output drive shaft 18. For the purpose of shifting the shift collar 38 to either position in engagement with coupling 14 or bushing 34 or to the neutral position shown in FIG. 1 in which it is out of engagement with both clutch rings, a shift fork 46 is provided. For the purpose of moving the shift fork 46 axially, a power actuated mechanism 48, only a fragmentary portion of which is shown, can be used. A suitable hydraulic cylinder arrangement for this purpose can be found in the aforesaid copending application of Mueller.

The shift mechanism 50 which includes the clutch rings 42 and 44 on the rotary members 30 and 32 and the shift collar 38 will now be described in greater detail with particular reference to FIGS. 2 - 6, inclusive. As thereshown, the shift collar 38 which is a component of one rotary member of the invention has a conventional slot 52 therein in which the shift fork 46 is fitted. The shift collar 38 also has around its inner periphery a plurality of splines 45. In the illustrated embodiment a total of twenty eight splines are employed. Similarly, the clutch ring 42 has splines 56, which in this embodiment are also 28 in number, and which are in mesh with the external splined surface 57 of coupling 14.

When the internal splines 54 of the shift collar 38 are moved into mesh with the external splines 57 of the rotary member 14, the coupling 14 and drive shaft 18 will rotate together. Engagement means, comprising the plurality of circumferentially spaced blocking members 58 on the shift collar 38 and the cam members 60 on the clutch ring 42, are provided initially to synchronize the rotation of the coupling 14 and the drive shaft 18 while aligning the splines 54 of the shift collar 38 with the splines 57, and thereafter to serve as axial guides while clutching the rotary members together so that the former splines 54 can be shifted axially onto the latter splines 57. Each cam 60 has a leading edge 62, a trailing edge 64, and a surface 66 inclined circumferentially away from the shift collar 38 and its blocking members 58, terminating at the trailing edge 64. Defined between the leading edge 62 of one cam member 60 and the trailing edge 64 of the next adjacent cam member 60 are axial slots 68. As seen in FIG. 6, the edges 62 and 64 are parallel in an axial direction so that the slots 68 have transverse cross sections of uniform dimensions throughout their lengths by virtue of the leading and trailing surface 68a and 68b that extend longitudinally from the edges 62 and 64.

In the preferred form of the invention, four equiangularly spaced blocking members 58 are provided on the shift collar 38, and similarly, four equiangularly spaced cam members 60 are provided on the clutch ring 42. Thus, when the shift collar 38 is moved axially toward engagement with the clutch ring 42, each blocking member 58 will have available to it approximately one quarter or 90° of the circumference of the clutch ring 42 to be engaged and then for use in guiding the blocking member 58 into one of the axial slots 68.

Referring to FIG. 6, the shift collar 38 is shown at A in a position wherein its blocking member 58 has been moved axially the full extent into the slot 68 so that the splines 54 of shift collar 38 are in mesh with the splines 57 of coupling 14. Thus, a direct drive is provided from the coupling 14, through the shift collar 38 to the shaft 18. The shift collar 38 is shown at B in a neutral position, corresponding to that of FIG. 1, wherein the blocking members 58 on both sides of the shift collar 38 are spaced axially from their associated clutch rings 42 and 44.

The shift collar is shown at C in an intermediate position wherein it has been shifted axially sufficiently far to make engagement with the clutch ring 44 and has been guided on the surface 66 to a position wherein it can now be advanced axially still further to the position at D wherein the splines 54 of shift collar 38 are in mesh with the splines of bushing 34, thereby drivingly connecting bushing 34, ring gear 32 and shift collar 38 to provide a low speed drive range for shaft 18. To facilitate travel of blocking members 58 on the surface 66, an inclined face 70, complementary to that of surface 66 is provided on each blocking member 58.

From the foregoing it can be understood that when the shift collar 38 is moved by a suitable power means axially toward one or the other of the clutch rings 42, 44, an arcuate span of the clutch ring equal to approximately that of seven splines is available for engagement by the leading end of each blocking member 58, and from any position of engagement, the blocking members 58 will then be guided to the position at C in response to the rotary action of the clutch ring 42 or 44 and the axial thrust applied to shift collar 38. Further advance of shift collar 38 will engage external splines of coupling 14 or bushing 34. Thus, a smooth, quiet and positive shift action is provided.

It is claimed:

1. A shift mechanism for a transmission comprising first and second rotary members mounted for rotation adjacent to one another about a common axis, said rotary members having external splines around outer peripheries corresponding in numbers and dimensions, a shift collar having internal splines around an inner circumference mounted with its internal splines in mesh with the external splines of one of said rotary members, said shift collar being shiftable axially to a position so that its internal splines are also in mesh with the external splines of the other rotary member to provide corotation of said rotary members, and engagement means for synchronizing rotation of said other rotary member with said shift collar for uniform corotation during initial axial movement of said shift collar and thereafter for guiding the splines of said shift collar into the external splines of said other rotary member during further axial movement of said shift collar, said engagement means including a plurality of circumferentially spaced blocking members on one of the parts to be synchronized axially directed toward the other of the parts to be synchronized, each blocking member having uniform transverse dimensions throughout its length, and a plurality of circumferentially spaced cam members on the other of the synchronized parts axially directed toward said one synchronized part, each of said cam members having a surface inclined circumferentially away from said one part and terminating in a trailing edge spaced from the leading edge of the next adjacent cam member, and leading and trailing surfaces extending longitudinally from its leading and trailing edges to provide an axial slot of uniform transverse cross section throughout its length and of a dimension sufficient to accommodate a blocking member of said one part, the splines of said shift collar and said one rotary member being in alignment with one another for meshing when said blocking member is in axial alignment with said slot.

2. The shift mechanism that is defined in claim 1, wherein the angular dimension from the leading edge of one cam member to the leading edge of the next adjacent cam member is approximately seven times as great as the corresponding angular dimension of adjacent spines of one of said rotary members.

3. The shift mechanism that is defined in claim 2, wherein the splines of one of said rotary members are twenty eight in number and the cam members of said other synchronized part are four in number.

4. The shift mechanism that is defined in claim 1, wherein the axially directed end surface of each of said blocking members has an inclined portion complementary to that of each cam member.

5. The shift mechanism that is defined in claim 1, wherein said cam members are on said other rotary member and said blocking members are on said shift collar.

6. The shift mechanism that is defined in claim 1, wherein a third rotary member is mounted for rotation about said common axis adjacent to said one rotary member, said one rotary member being located between said second and third rotary members, and said third rotary member is constructed and arranged the same as said second rotary member, said shift collar being on said one rotary member so that said shift collar can be shifted axially in one direction to a position to provide corotation of the first and second rotary members and in the other direction to a position to provide corotation of the first and third rotary members.

7. A shift mechanism for a transmission comprising first and second rotary members mounted for rotation adjacent to one another about a common axis, said rotary members having external splines around outer peripheries corresponding in numbers and dimensions, a shift collar having internal splines around an inner circumference mounted with its internal splines in mesh with the external splines of one of said rotary members, said shift collar being shiftable axially to a position so that its internal splines are also in mesh with the external splines of the other rotary member to provide corotation of said rotary members, and engagement means for synchronizing rotation of said other rotary member with said shift collar for uniform corotation during initial axial movement of said shift collar and thereafter for guiding the splines of said shift collar into the external splines of said other rotary member during further axial movement of said shift collar, said engagement means including a plurality of circumferentially spaced blocking members on one of the parts to be synchronized, each blocking member having uniform transverse dimensions throughout its length, and a plurality of circumferentially spaced cam members on the other of the synchronized parts axially directed toward said one synchronized part, each of said cam members having a surface terminating in a trailing edge spaced from the leading edge of the next adjacent cam member, and leading and trailing surfaces extending longitudinally from its leading and trailing edges to provide an axial slot of uniform transverse cross section throughout its length and of a dimension sufficient to accommodate a blocking member of said one part, the splines of said shift collar and said one rotary member being in alignment with one another for meshing when said blocking member is in axial alignment with said slot.

* * * * *